Oct. 31, 1939.                M. WARE                    2,178,444
                        VALVE SPRING DAMPENER
                         Filed Feb. 21, 1938

INVENTOR
Marsden Ware.
BY Tibbetts & Hart
ATTORNEYS.

Patented Oct. 31, 1939

2,178,444

UNITED STATES PATENT OFFICE 2,178,444

VALVE SPRING DAMPENER

Marsden Ware, Detroit, Mich., assignor to Packard Motor Car Company, Detroit, Mich., a corporation of Michigan Application February 21, 1938, Serial No. 191,675

8 Claims. (Cl. 267—1)

This invention relates to spring structures and more particularly to engine valve spring constructions.

An object of the invention is to reduce engine valve and valve seat wear by the provision of a spring structure arranged to resist valve rotation.

Another object of the invention is to provide an anchor member for a poppet valve spring which resists spring rotation during deflection.

A further object of the invention resides in the provision of a member with a valve structure that will damp the vibrations of a coil spring and anchor one end of the spring to restrict its rotation.

Still another object of the invention is to provide an inexpensive stamping that can be readily associated with an engine and valve structure to resist spring deflection and rotation.

Other objects of the invention will appear from the following description taken in connection with the drawing, which forms a part of this specification, and in which.

Figure 1:
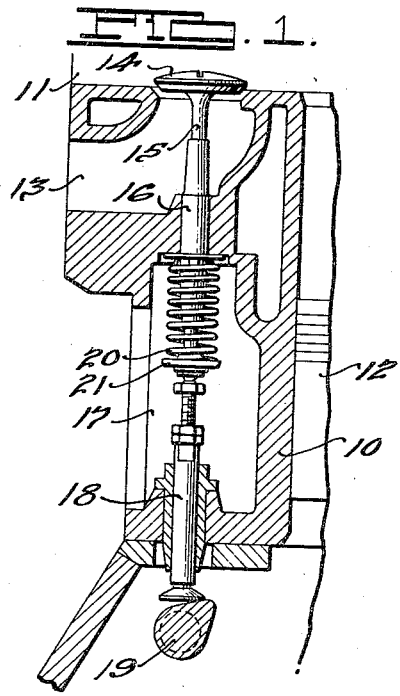
Fig. 1 is a fragmentary sectional view of an engine having a valve structure incorporating the invention associated therewith.
Figure 2:
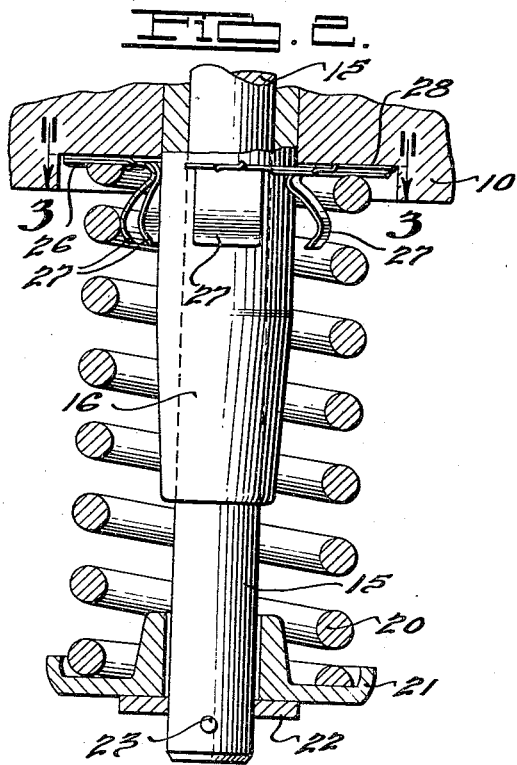
Fig. 2 is an enlarged view of the valve structure shown in Fig. 1.
Figure 3:
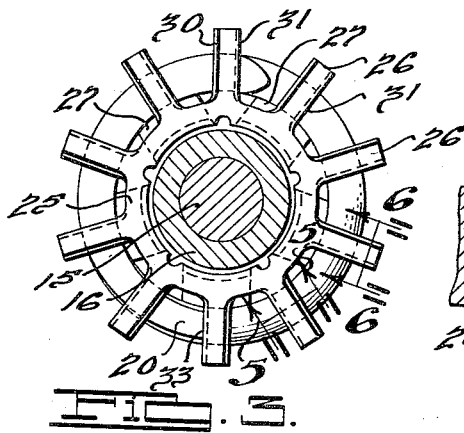
Fig. 3 is a sectional view of the valve structure taken on line 3—3 of Fig. 2.
Figure 4:
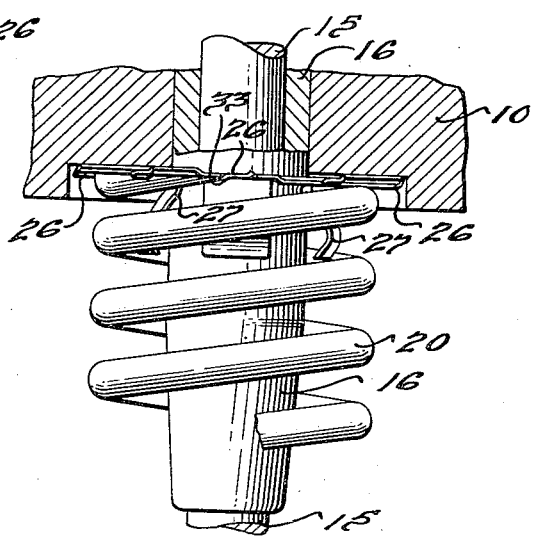
Fig. 4 is a view similar to Fig. 2 but with the valve spring unsectioned.
Figure 5:
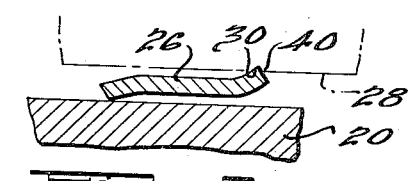
Fig. 5 is a sectional view taken on line 5—5 of Fig. 3 of one of the resilient anchor fingers in assembled relation with the end coil of the spring and the engine.
Figure 6:
Fig. 6 is a similar sectional view of the resilient finger in Fig. 5 taken on line 6—6 of Fig. 3.

In the drawing 10 indicates a cylinder block of an internal combustion engine having a removable head 11 that provides a combustion chamber over the reciprocating piston 12. A passage 13 extends through a portion of the cylinder block and communicates at one end with the combustion chamber and at the other end with a conventional form of manifold (not shown). This passage may be either the exhaust or the intake passage of the engine.

A poppet valve consisting of a head 14 and a stem 15 is arranged in the conventional manner to control flow through the passage 13 at its junction with the combustion chamber. The valve stem extends through and is guided by a conventional form of bushing 16 mounted in a wall of the cylinder block and the stem projects through the bushing into valve chamber 17. Associated with the valve stem is a tappet 18 that engages a cam on the engine driven cam shaft 19. Surrounding the valve stem portion projecting into the valve chamber is a coil spring 20, such spring being seated at one end in a retainer 21 that is secured against displacement from the valve stem by washer 22 and pin 23.

The valve structure so far described is conventional and it is the usual practice to arrange the spring so that it is free to rotate during deflection, the end of the spring opposite the retainer 21 usually bearing against a wall of the valve chamber. This movement in a rotational direction of the spring during its deflection periods causes similar rotational movements of the valve stem. I have found that such rotational movements of the valve occur partly while the head 14 engages its seat thereby causing undue wear that deforms the meeting faces to an extent that inaccurate seating and consequent loss of engine efficiency results sooner than is desired. It is also known that the contacting faces of the valve head and its seat are subjected to excessive wear because of spring surge occurring noticeably in high speed combustion engines. The main purpose of the present invention is to provide a valve structure in which surging and rotation of the spring are restricted to prolong the efficiency of valve operation.

To this end I provide a combined spring anchor and damper means formed preferably as a stamped element. Such element is comprised of a flat base portion 25 from the outer periphery of which extends a set of spaced resilient fingers 26, and from the inner periphery of which extends a set of spaced resilient fingers 27.

The stamping may be termed a seat member for the spring as it is engaged by the end of the spring opposite that engaging the retainer 21, and it is arranged to bear against a wall 28 in the valve chamber of the cylinder block. The resilient fingers 27 are arranged to extend into the end of the coil spring and they are bowed outwardly to frictionally engage one or more of the coils of the spring. This lateral engagement of the fingers 27 with the spring 20 will retard deflection of the spring and thereby lessen the tendency for the spring to surge.

The resilient fingers 26 are twisted so that one edge 30 projects above the upper face of the main body portion of the stamping and the other edge 31 projects below the under face of the main body portion of the stamping. The stamping is formed preferably of harder material than the cylinder block and the upstanding finger edges 30 will dig into the adjacent cylinder block wall and form recesses 40 that anchor the fingers and prevent rotation of the stamping. This digging-in of the finger edges will of course result from the pressure exerted by spring 20 and its tendency to turn in a rotational direction during deflection movements. It is not necessary that the spring action be utilized to cause the stamping to anchor itself, as suitable recesses can be formed in the wall 28 to receive the anchoring edges 30. The depending edges 31 provide a seat for the end coil of the spring, and the end 33 of spring 20 will abut one of these depending finger edges 31 and anchor thereagainst, thus retarding rotative movements of the coil spring during deflection. The anchored end of the spring will of course be held stationary as the rotational tendency of the spring is always in a direction toward the abutment. This retarding of spring rotation will likewise retard rotation of the valve stem even though the spring 20 is not fixed to the retainer 21, other than by the frictional engagement therewith.

By thus retarding rotational movements of the valve and by reducing surging of the valve, rotation of the valve against its seat and violent striking of the valve against its seat are materially reduced, thus increasing the efficient life of the valve structure. The spring seating member functions to provide these improved valve conditions and by forming the seating member as a stamping a simple and inexpensive element can be utilized to obtain these desired results.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A coil spring seat member comprising a flat body portion, resilient damping fingers depending from one face of the body portion for engaging spring coils, and resilient fingers at the periphery of the body portion, one of said peripheral fingers being engaged by the spring end to restrict spring rotation during deflection.

2. In an engine, a wall, a valve having a stem extending through the wall and mounted to be reciprocated and to rotate, a coil spring encircling the valve stem, retainer means on the stem against which one end of the spring frictionally engages, and another retainer means against which the other end of the spring engages, said last mentioned retainer means being anchored to said wall and forming an abutment with the adjacent spring end to prevent movement thereof in a rotary direction.

3. In an engine, a valve mounted to be reciprocated and to rotate, a coil spring frictionally associated at one end with said valve and normally exerting pressure in a direction and sufficient to seat the valve, and means holding the other end of said spring from movement in a rotary direction.

4. In an engine, a wall, a valve having a stem extending through the wall and mounted to be reciprocated and to rotate, a coil spring encircling the valve stem, a retainer means on the stem against which one end of the spring frictionally engages, and a stamping with which the other end of the spring engages, said stamping being formed with a finger having a projecting edge anchored to said wall and an abutment edge with which the spring end engages to prevent rotational movement thereof.

5. In an engine, a wall, a valve having a stem extending through the wall and mounted to be reciprocated and to rotate, a coil spring encircling the valve stem, a retainer means on the stem against which one end of the spring frictionally engages, and a retainer element with which the other end of the spring engages, said element having an anchor portion projecting from one face engaging said wall and an abutment projecting from the opposite face against which the end of the spring engages to prevent rotation thereof.

6. In an engine, a wall, a valve having a stem extending through the wall and mounted to be reciprocated and to rotate, a compressed coil spring encircling a portion of the valve stem, retainer means on the stem frictionally engaged by one end of said spring, and a unitary member anchored to the wall and engaged by the other end of the spring in a relation preventing rotation thereof, said member having portions frictionally engaging convolutions of said spring in deflection resisting relation.

7. In an engine, a wall, a valve having a stem extending through the wall and mounted to be reciprocated and to rotate, a coil spring encircling a portion of the valve stem and related therewith to normally seat the valve, a retainer on the valve stem engaged by one end of said spring, and a member against which the other end of the spring seats, said member having anchor portions engaging said wall, an abutment portion engaged by the adjacent spring end and deflection damping portions engaging convolutions of the spring.

8. In an engine, a wall, a valve having a stem extending through the wall and adapted to rotate and to be reciprocated, a coil spring encircling a portion of the valve stem and having one end connected to exert pressure on the stem tending to normally seat the valve, and a seat member for the other end of the spring comprising a flat body portion, resilient fingers engaging the spring in a relation to damp deflection thereof, and radial fingers having edge portions anchored in said wall, one of said radial fingers being engaged by the adjacent end of the spring to prevent rotation thereof.

MARSDEN WARE.